United States Patent
Kamath et al.

(10) Patent No.: US 9,342,254 B2
(45) Date of Patent: May 17, 2016

(54) SECTOR-BASED WRITE FILTERING WITH SELECTIVE FILE AND REGISTRY EXCLUSIONS

(75) Inventors: Udyavara Srikanth Kamath, Redmond, WA (US); Abdelkader Bahgat, Bothell, WA (US); Chesong Lee, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 135 days.

(21) Appl. No.: 13/153,397

(22) Filed: Jun. 4, 2011

(65) Prior Publication Data

US 2012/0311263 A1 Dec. 6, 2012

(51) Int. Cl.
| | | |
|---|---|---|
| G06F 12/00 | (2006.01) | |
| G06F 13/00 | (2006.01) | |
| G06F 13/28 | (2006.01) | |
| G06F 3/06 | (2006.01) | |
| G06F 12/08 | (2016.01) | |

(52) U.S. Cl.
CPC ........... *G06F 3/0643* (2013.01); *G06F 3/0622* (2013.01); *G06F 3/0659* (2013.01); *G06F 3/0674* (2013.01); *G06F 12/0866* (2013.01); *G06F 2212/461* (2013.01)

(58) Field of Classification Search
CPC .................................................... G06F 3/0643
USPC .......................................................... 711/119
See application file for complete search history.

(56) References Cited

U.S. PATENT DOCUMENTS

| | | | | | |
|---|---|---|---|---|---|
| 4,811,293 | A | * | 3/1989 | Knothe et al. | 365/195 |
| 5,581,736 | A | * | 12/1996 | Smith | 711/170 |
| 5,657,445 | A | * | 8/1997 | Pearce | 726/23 |
| 5,664,217 | A | * | 9/1997 | Cunningham et al. | 710/1 |
| 5,754,821 | A | * | 5/1998 | Cripe et al. | 711/164 |
| 5,991,847 | A | * | 11/1999 | Ballard et al. | 711/3 |
| 6,202,136 | B1 | * | 3/2001 | Wikle et al. | 711/162 |
| 6,327,584 | B1 | * | 12/2001 | Xian et al. | |
| 6,336,171 | B1 | * | 1/2002 | Coskrey, IV | 711/152 |
| 6,336,175 | B1 | * | 1/2002 | Shaath et al. | 711/163 |
| 6,523,103 | B2 | * | 2/2003 | Page | 711/173 |
| 6,539,456 | B2 | * | 3/2003 | Stewart | 711/113 |
| 6,654,864 | B2 | * | 11/2003 | Shaath et al. | 711/163 |
| 6,886,038 | B1 | * | 4/2005 | Tabbara et al. | 709/223 |
| 6,904,496 | B2 | * | 6/2005 | Raves et al. | 711/113 |
| 7,036,040 | B2 | * | 4/2006 | Nicholson et al. | 714/6.31 |
| 7,171,511 | B2 | * | 1/2007 | Yagawa | 711/100 |
| 7,290,115 | B2 | * | 10/2007 | Hill et al. | 711/207 |
| 7,308,547 | B2 | * | 12/2007 | Page et al. | 711/163 |
| 7,383,407 | B1 | * | 6/2008 | Kiselev | 711/162 |
| 7,454,653 | B2 | * | 11/2008 | Nicholson et al. | 714/47.2 |
| 7,457,880 | B1 | * | 11/2008 | Kim | 709/229 |

(Continued)

OTHER PUBLICATIONS

File-Based Write Filter, MSDN, Oct. 18, 2006, 81 pages.*

(Continued)

*Primary Examiner* — Sanjiv Shah
*Assistant Examiner* — Daniel C Chappell
(74) *Attorney, Agent, or Firm* — John Jardine; Raghu Chinagudabha; Micky Minhas (57) ABSTRACT

A method includes mounting a persistent volume of a data storage device of an electronic device. The persistent volume is based on a protected volume stored at the data storage device. The method also includes accessing the persistent volume to enable servicing access to the data storage device of the electronic device.

19 Claims, 7 Drawing Sheets

(56) References Cited

U.S. PATENT DOCUMENTS

| | | | |
|---|---|---|---|
| 7,603,532 B2* | 10/2009 | Rajan | G06F 3/0608 |
| | | | 707/999.202 |
| 7,620,773 B2* | 11/2009 | Nicholson et al. | 711/113 |
| 7,739,312 B2* | 6/2010 | Gordon | G06F 3/0608 |
| | | | 707/802 |
| 7,739,380 B2* | 6/2010 | Hunt et al. | 709/225 |
| 7,765,361 B2* | 7/2010 | Dhamankar et al. | 711/135 |
| 7,840,730 B2 | 11/2010 | D'Amato et al. | |
| 7,890,543 B2* | 2/2011 | Hunt et al. | 707/803 |
| 8,131,765 B2* | 3/2012 | Kelso | G06F 3/061 |
| | | | 707/786 |
| 8,370,835 B2* | 2/2013 | Dittmer | 718/1 |
| 8,402,069 B2* | 3/2013 | Rajaram et al. | 707/821 |
| 8,510,352 B2* | 8/2013 | Mehra et al. | 707/831 |
| 2002/0141594 A1 | 10/2002 | MacKenzie et al. | |
| 2003/0018865 A1* | 1/2003 | Page | 711/163 |
| 2003/0221083 A1* | 11/2003 | Hill et al. | 711/207 |
| 2005/0027957 A1* | 2/2005 | Page et al. | 711/163 |
| 2005/0044548 A1* | 2/2005 | Page | 718/100 |
| 2005/0144519 A1* | 6/2005 | Hill et al. | 714/13 |
| 2006/0117018 A1* | 6/2006 | Christiansen et al. | 707/10 |
| 2006/0179261 A1* | 8/2006 | Rajan | 711/162 |
| 2006/0233367 A1* | 10/2006 | Birrell et al. | 380/210 |
| 2006/0265756 A1* | 11/2006 | Campbell et al. | 726/26 |
| 2007/0101079 A1* | 5/2007 | Macintyre et al. | 711/163 |
| 2007/0186070 A1* | 8/2007 | Federa et al. | 711/163 |
| 2008/0082752 A1* | 4/2008 | Chary et al. | 711/118 |
| 2008/0123211 A1* | 5/2008 | Chng et al. | 360/55 |
| 2009/0006713 A1* | 1/2009 | Royer | G06F 3/0607 |
| | | | 711/6 |
| 2009/0043831 A1* | 2/2009 | Antonopoulos et al. | 707/205 |
| 2009/0164738 A1* | 6/2009 | Erfani et al. | 711/142 |
| 2009/0287890 A1* | 11/2009 | Bolosky | 711/155 |
| 2010/0241807 A1* | 9/2010 | Wu | G06F 17/30233 |
| | | | 711/118 |
| 2012/0042182 A1* | 2/2012 | Fulkerson et al. | 713/320 |
| 2013/0173744 A1* | 7/2013 | Xinglong et al. | 709/217 |

OTHER PUBLICATIONS

Enhanced Write Filter, MSDN, Oct. 18, 2006, 156 pages.*
A proposal to establish a pseudo virtual memory via writable overlays, Thomas R. Spacek, Communications of the ACM, vol. 15, iss. 6, 1972, pp. 421-426 (6 pages).*
Definition of distinct, Dictonary.com, retrieved from http://dictionary.reference.com/browse/distinct on Jan. 30, 2014 (1 page).*
Definition of operating system, Free Online Dictionary of Computing, Jun. 9, 1999, retrieved from http://foldoc.org/operating%20system on Jun. 18, 2015 (2 pages).*
Dealing With Communications Failures in a Distributed File System; IBM Technical Disclosure Bulletin, vol. 34, Iss. 3; TDB-ACC-NO NN9108282; Aug. 1, 1991; pp. 282-283 (2 pages).*
Milong Sabandith, "Designing Scenarios with New File-Based Write Filter", Retrieved at <<http://rtcmagazine.com/articles/view/100816>>, Mar. 2007, Microsoft, RTC Group, Inc., Retrieved Date: Mar. 8, 2011, pp. 1-4.
Liming et al., First Look at the File Based Write Filter, Retrieved at http://www.annabooks.com/Articles/Articles_XPE/FBWF.pdf, SJJ Embedded Micro Solutions, LLC., Sep. 2006, pp. 1-12.
Kim et al., "A PRAM and NAND Flash Hybrid Architecture for High-Performance Embedded Storage Subsystems", Retrieved at <<http://veryoldwww.cs.pitt.edu/PARTS/p-rew/papers/p31-kim.pdf>>, Proceedings of the 8th ACM international conference on Embedded software, Oct. 19-24, 2008, pp. 31-39.
"Working with Filesystems", Retrieved at <<http://www.qnx.com/developers/docs/6.3.2/neutrino/user_guide/fsystems.html>>, QNX Software Systems, Retrieved Date: Mar. 8, 2011, pp. 1-9.

* cited by examiner

SECTOR-BASED WRITE FILTERING WITH SELECTIVE FILE AND REGISTRY EXCLUSIONS

BACKGROUND

Data stored in computer systems can be classified as system data and user data. System data may be protected from being accidentally overwritten by users or user processes. For example, an operating system and applications of a stateless electronic device, such as a computing device (e.g. a point of sale device, a kiosk, or an embedded device), may have read-only access to system memory within the device to enable stateless operation. One method of protecting data from being overwritten is by using a write filter that redirects write operations to a non-system area of the memory. However, write filters may be disabled and user access to the device may be interrupted so that an administrator can access the system memory, such as for installing software updates. For example, applications executing at the device may be halted while a system update is performed. Systems or devices that are frequently updated or otherwise involve administrative access or assistance may have frequent service interruptions. In addition, disabling the write filters may leave system data in an unprotected state.

SUMMARY

Systems and methods of write filtering are disclosed. The disclosed systems and methods may enable "online" servicing access to a data volume. For example, the write filter techniques disclosed herein may enable servicing access (e.g., operating system file, folder, or registry updates) to a hard disk or other storage device while the storage device remains accessible to users. To illustrate, a hard disk may store a protected volume. Write operations that are directed to the hard disk may generally be routed to the protected volume and may be completed at a cache. When a write operation is associated with a file that is excluded from write filtering, the write operation may be routed to a persistent volume instead of to the protected volume. Files may be excluded statically or dynamically. The persistent volume may be created based on the protected volume and may enable completion of the write operation at the disk. Prior to completion of the write operation, the sector of the hard disk that includes the file may be mirrored at the cache, so that subsequent read requests routed to the protected volume may be completed as if the underlying sector of the hard disk were unchanged.

BRIEF DESCRIPTION OF THE DRAWINGS

The present disclosure may be better understood and its numerous features and advantages made apparent to those skilled in the art by referencing the accompanying drawings.

The use of the same reference symbols in different drawings indicates similar or identical items.

DETAILED DESCRIPTION

A disclosed system and method may perform write filtering including use of file and registry based exclusions and sector-based caching of data stored on a data storage device (e.g., hard disk). For example, the data storage device may be logically partitioned into a protected volume and a persistent volume, where the persistent volume is based on (e.g., has common underlying data with) the protected volume. Write requests directed to files that are write-filtered may be routed to the protected volume, whereas write requests that are directed to files that are excluded from write filtering may be directed to the persistent volume. The persistent volume may be mounted on demand to perform system updates and other system servicing operations. Moreover, servicing requests may be completed online, i.e., without interrupting operation of applications executing at an electronic device that includes the storage device. To illustrate, even though a servicing request modifies a sector of the data storage device, a previous version of the sector may be cached so that read requests that are routed to the protected volume can be completed.

In a particular embodiment, a method includes mounting a persistent volume of a data storage device of an electronic device, where the persistent volume is based on a protected volume stored at the data storage device. The method also includes accessing the persistent volume to enable servicing access to the data storage device of the electronic device. For example, the data storage device may be a nonvolatile computer memory, such as a hard disk or a solid state storage device.

In another particular embodiment, a system includes a processor, a data storage device, and a write filter. The write filter includes a redirector executable by the processor to determine whether to route a write request for a particular file stored at a particular sector of the data storage device to a protected volume or to a persistent volume. The write filter also includes an overlay manager that is executable by the processor to write data to an overlay cache associated with the protected volume when the write request is routed to the protected volume. The overlay manager is also executable by the processor to mirror the particular sector at the overlay cache and write the data to the particular sector when the write request is routed to the persistent volume.

In another particular embodiment, a computer-readable storage medium includes instructions that, when executed by a computer, cause the computer to create a persistent volume at a data storage device of an electronic device, where the persistent volume is created based on a protected volume at the data storage device. The instructions, when executed, also cause the computer to mount the persistent volume and to receive a write request for a particular file stored at a particular sector of the data storage device. The instructions, when executed by the computer, further cause the computer to determine whether to route the write request to the protected volume or to the persistent volume. The instructions, when executed by the computer, cause the computer to write data to an overlay cache associated with the protected volume when the write request is routed to the protected volume. The instructions, when executed by the computer, also cause the computer to mirror the particular sector at the overlay cache associated with the protected volume and write the data to the particular sector when the write request is routed to the persistent volume. The instructions, when executed by the computer, further cause the computer to unmount the persistent volume.

Figure 1:
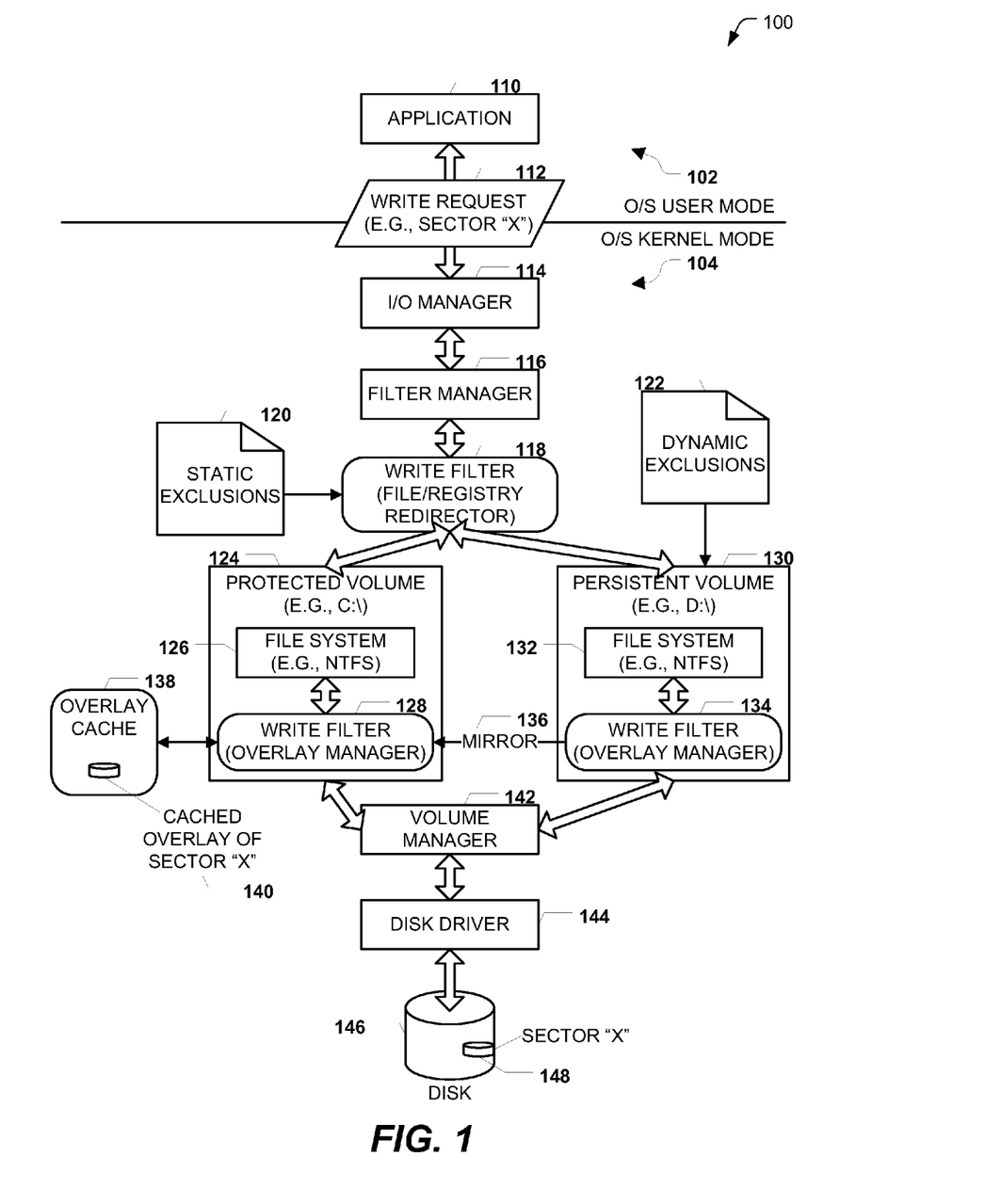
FIG. 1 is a diagram to illustrate a particular embodiment of a system to perform sector-based write filtering.

Referring to FIG. 1, a system 100 including an operating system having a user mode 102 and a kernel mode 104 is illustrated. For example, the system 100 may be an electronic device or other type of computing device (or multiple devices) and a user may use the system 100, such as by use of a computer application 110 executing on a processor of the system 100. In a particular embodiment, the system 100 may be a mobile computing device, a personal computing device, or any combination thereof. Alternately, or in addition, the system 100 may be a stateless device (e.g., a device that conducts each transaction or session independently of any other transaction or session), such as a kiosk, a point of sale device, an embedded device, or any combination thereof.

The user mode 102 may support execution of applications, such as the application 110, which may issue a write request 112. For example, a write request may be issued by the application 110 to write data to a particular file stored in a particular sector of a data storage device, such as a computer memory. In a particular embodiment, the system 100 includes nonvolatile memory, such as a nonvolatile data storage device 146. The nonvolatile data storage device 146 is illustrated as a hard disk but alternately may be a solid-state storage device or other similar type of data storage. In the particular embodiment illustrated in FIG. 1, the write request 112 is issued by the application 110 to write data to a sector X 148 of the nonvolatile data storage device 146.

Operating system components in the kernel mode 104 may include an input/output (I/O) manager 114, a filter manager 116, a file/registry redirector 118, a protected volume 124, and a persistent volume 130. The kernel mode 104 has access to an overlay cache 138 that is coupled to or otherwise accessible to the protected volume 124. The kernel mode 104 further includes a volume manager 142 and a disk driver 144 that communicates with the storage device 146. The persistent volume 130 corresponds to and is based on the protected volume 124. For example, the persistent volume 130 may reflect a directory structure of the protected volume 124 and may have the same underlying data on the data storage device 146 as the protected volume 124. Both the protected volume 124 and the persistent volume 130 are responsive to the redirector 118. The redirector 118 may redirect write requests (e.g., the write request 112) based at least in part on static exclusions 120. When files or registry keys are written by an administrator or system-level application via the persistent volume 130, dynamic exclusions 122 for the files or registry keys may be created.

The static exclusions 120 may include a list of files, folders, and registry keys that are excluded from write filtering. In a particular embodiment, when a file, folder, or registry key is excluded from write filtering, write requests directed to the corresponding sector of the data storage device 146 may be routed to the persistent volume 130 and completed at the data storage device 146. The static exclusions 120 may be defined (e.g., by a user or an administrator) prior to runtime at the system 100.

The dynamic exclusions 122 may be created, deleted, and modified during runtime at the system 100. For example, an administrator or system-level application at the system 100 may mount the persistent volume to initiate a servicing access. When the administrator or the system-level application writes to a file or registry key, an exclusion for the file or registry key may be created in the dynamic exclusions 122 (e.g., so that subsequent writes to the file or registry key by the administrator or the system-level application are routed to the persistent volume 130).

In a particular embodiment, the protected volume 124 may be a logical volume of the data storage device 146, where the logical volume may be labeled with a designator, such as "C:\." The persistent volume 130 may correspond to a particular portion of the data storage device 146 and may be a logical volume of the storage device 146, where the logical volume may be labeled using a designator, such as "D:\." The protected volume 124 includes a file system 126 that interacts with an overlay manager 128. The file system 126 may be a computer file system, such as NTFS, FAT, ext4, or another file system. The persistent volume 130 includes a second file system 132 and a second overlay manager 134. The overlay manager 128 of the protected volume 124 and the overlay manager 134 of the persistent volume 130 each interact with the volume manager 142 that is coupled to the disk driver 144. The overlay manager 134 may mirror data, as shown at 136, to the overlay manager 128, which interacts with the overlay cache 138. The overlay cache 138 may include a copy of data written to the data storage device 146 via the protected volume 124 and a copy of data before it is written to the data storage device 146 via the persistent volume 130. For example, the overlay cache 136 may include a cached sector X 140 that corresponds to the sector X 148 of the data storage device 146 and that corresponds to the sector X identified by the write request 112.

During operation, the write request 112 may be received from the application 110 at the I/O manager 114. For example, the write request 112 may be a request to write data to a file, a folder, or a registry key stored in sector X 148 of the data storage device 146. The I/O manager 114 may forward the write request 112 to the filter manager 116. The filter manager 116 may apply filters, such as a write filter that includes the file/registry redirector 118 and the overlay managers 128 and 134, to the write request 112.

In a particular embodiment, the redirector 118 determines whether to route the write request 112 to the protected volume 124 or to the persistent volume 130. When the particular file, folder, or registry associated with the write request 112 is excluded from write filtering (e.g., the file, the folder, or the registry key is included in the static exclusions 120), the write request 112 is routed to the persistent volume 130. The persistent volume 130 may be hidden from, inaccessible to, or otherwise abstracted with respect to users and user-level applications (e.g., the application 110) of the system 100.

When the particular file that is the target of the write request 112 is not excluded from write filtering, the write request 112 is routed to the protected volume 124. When the write request 112 is routed to the protected volume 124, data corresponding to the write request 112 may be written to the overlay cache 138 in response to the write request 112. Once data is written to the overlay cache 138, such data may be read by the application 110 and other applications executing at the system 100. For example, the application 110 may initiate a read request (not shown). When the read request is for a changed sector of the data storage device 146, the overlay cache 138 is accessed in response to the read request. When the read request is for an unchanged sector of the data storage device 146, the unchanged sector may be accessed at the storage device 146 in response to the read request. Data stored within the overlay cache 138 may be discarded in response to detection of deletion of a file, a folder, or a registry key stored in the particular sector, in response to a system reboot, or any combination thereof.

When the write request 112 is routed by the redirector 118 to the persistent volume 130, data associated with the write request 112 may be written to the particular file in the particular sector of the data storage device 146 in response to the write request 112. For example, the write request 112 may be forwarded to the volume manager 142 and the disk driver 144, and the disk driver 144 may write the data to the data storage device 146. Prior to the data being written to the persistent volume 124, the particular sector may be mirrored to the overlay cache 138, as indicated at 136. Mirroring the particular sector to the overlay cache 138 may preserve data read integrity with respect to read requests that are routed to the protected volume 124, thereby keeping the existence of the persistent volume 130 and servicing operations performed via the persistent volume 130 hidden from the user. To illustrate, sector X 148 of the data storage device 146 may be written via the persistent volume 130 during a servicing request (e.g., a system update). By mirroring the old (i.e., pre-written) version of the sector X 148 to the overlay cache 138, the servicing access may be transparent to user applications. Such user applications may access the sector X 140 at the overlay cache 138 to complete read requests, thereby maintaining stateless operating conditions. From the perspective of the user applications, the data on the data storage device 146 has not changed (i.e., no changed state). Subsequent writes to the sector X 148 via the persistent volume 130 may not involve mirroring the sector X 148 to the overlay cache 138, since only an initial unchanged version of the sector X 148 may be cached to enable stateless operation.

As described above, the write request 112 may be a file write request or a folder write request. When the write request is a folder write request, multiple files or data associated with multiple files may be written to the data storage device 146 and/or to the overlay cache 138 in response to the folder write request. The write request 112 may alternately, or in addition, be a registry write request. In addition to write requests from the application 110, a write request may also correspond to system operations, such as a system update or other maintenance operations. In addition, an administrator may access the data storage device 146 by use of the persistent volume 130 to perform system operations and servicing accesses.

As described above with reference to FIG. 1, the system 100 includes a processor (not shown), a data storage device 146, and a write filter. The write filter includes a redirector, such as the file/registry redirector 118, that is executable by the processor to determine whether to route a write request (e.g., the write request 112) for a particular file stored at a particular sector (e.g., the sector X 148) of the data storage device 146 to a protected volume (e.g., the protected volume 124) or to a persistent volume (e.g., the persistent volume 130). The write filter also includes an overlay manager (e.g., the overlay managers 120 and 134) that is executed by the processor to write data to the overlay cache 138 associated with the protected volume 124 when the write request 112 is routed to the protected volume 124. The overlay manager is also executable by the processor to mirror (e.g., as indicated at 136) the particular sector (e.g., sector X 148) at the overlay cache 138 and to write the data to the particular sector (e.g., sector X 148) of the data storage device 146. The write request 112 may be issued by the application 110 supported by the user mode 102 of an operating system. The write filter may be integrated within the kernel mode 104 of the operating system, as shown. The kernel mode 104 may include or interact with other components of the system 100, such as the I/O manager 114, the filter manager 116, the volume manager 142, and/or the driver 144, as illustrated in FIG. 1.

Thus, the system 100 of FIG. 1 may enable sector-based write filtering of data stored at the data storage device 146, where such write filtering supports both static exclusions as well as dynamic exclusions. The system 100 of FIG. 1 may also enable online servicing access to the storage device 146 via the persistent volume 130. Applications may continue to execute during and after the servicing access and may read data corresponding to serviced sectors from the overlay cache 138 instead of from the data storage device 146.

Figure 2:
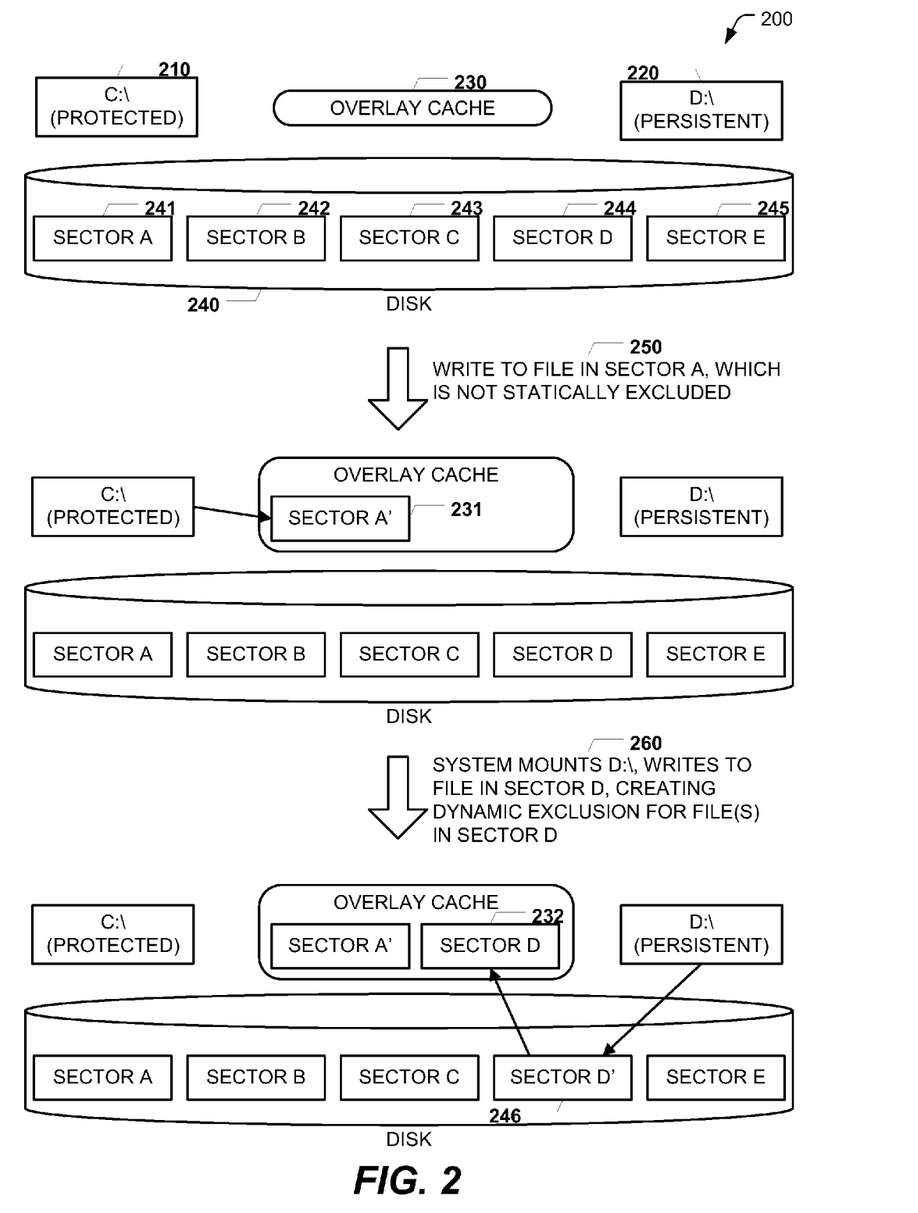
FIG. 2 is a diagram to illustrate a particular embodiment of performing write operations at the system 100 of FIG. 1.

Referring to FIG. 2, a method 200 of operation of the write filter and the system 100 is illustrated. FIG. 2 illustrates a protected volume 210 (e.g., the protected volume 124 of FIG. 1), an overlay cache 230 (e.g., the overlay cache 138 of FIG. 1), and a persistent volume 220 (e.g., the persistent volume 130 of FIG. 1). FIG. 2 also illustrates a data storage device 240 (e.g., the data storage device 148 of FIG. 1) that includes multiple sectors 241-245 of data stored within the data storage device 240.

In response to a write request 250 to write a file to the sector A 241, where the file is not statically excluded from write filtering, the write request 250 may be routed to the protected volume 210 (labeled "C:\"). A copy of the sector A 241 may be stored in the overlay cache 230 and written at the overlay cache 230, thereby forming an updated sector A' 231.

Subsequently, a system (e.g., the system 100 of FIG. 1) may mount the persistent volume 220 (labeled "D:\") and may write to a file in the sector D 244, as indicated at 260. For example, the persistent volume 220 may be mounted and the sector D 244 may be written during a servicing access, thereby forming an updated sector D' 246. Prior to the write operation, a copy of the unwritten sector D 244 may be mirrored in the overlay cache 230 as sector D 232. A dynamic exclusion for the file may also be created (e.g., in the dynamic exclusions 122 of FIG. 1).

Thus, by maintaining changed sectors that are written via a protected volume and unchanged (i.e., pre-write) sectors that are written via a persistent volume in an overlay cache, the method 200 of FIG. 2 may enable stateless operation for applications that are supported by the protected volume and may hide online servicing accesses performed via the persistent volume.

Figure 3:
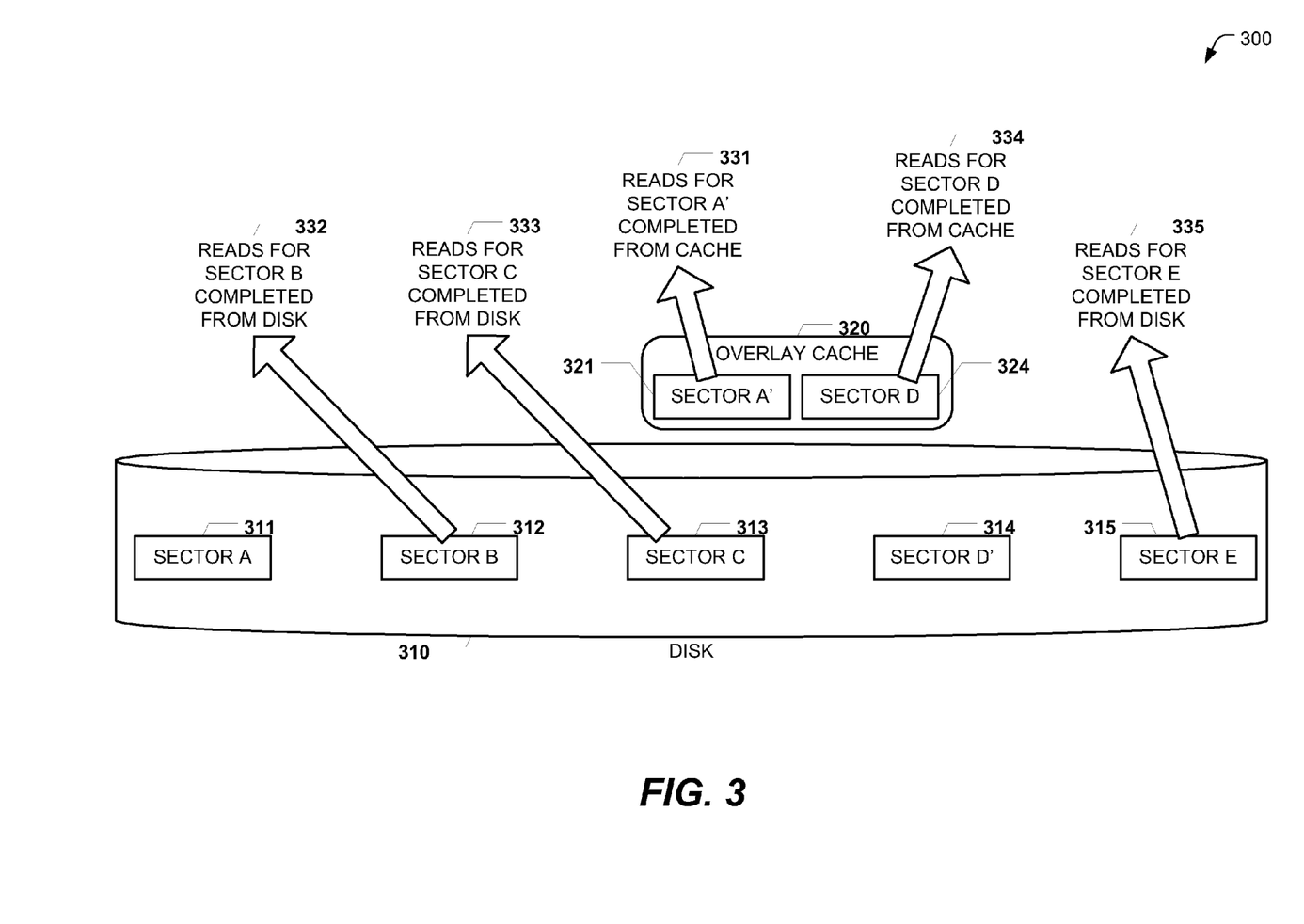
FIG. 3 is a diagram to illustrate a particular embodiment of a method of performing read operations at the system 100 of FIG. 1 after the write operations of FIG. 2 have been performed.

Referring to FIG. 3, a particular embodiment of performing read operations after performing the write operations of FIG. 2 is disclosed.

FIG. 3 illustrates a data storage device 310 (e.g., the data storage device 240) and an overlay cache 320 (e.g., the overlay cache 230 of FIG. 2) reflecting a state of a system following completion of the write operations illustrated in FIG. 2. For example, the data storage device 310 includes multiple sectors 311-315. Sectors A 311, B 312, C 313, D' 314, and E 315 may correspond to sectors A 241, B 242, C 243, D' 246, and E 245 of FIG. 2, respectively. The overlay cache 320 may store a sector A' 321 (e.g., corresponding to the sector A' 231 of FIG. 2) and a sector D 324 (e.g., corresponding to the sector D 232 of FIG. 2).

Following the write operations of FIG. 2, read requests 331 for the sector A' 321 and read requests 334 for the sector D 324 may be completed by accessing the overlay cache 320, as shown. In addition, following the write operations of FIG. 2, read requests 332, 333, and 335 for the sectors B 312, C 313, and E 315, respectively, may be completed by reading data from the data storage device 310, as shown. Thus, when data is written via a persistent volume, such as the data written to form the sector D' 314, the modified data may be stored on the data storage device 310 (and may be available for further modification during servicing access) while the original data (i.e., the sector D 324) may be readable from the overlay cache 320.

Figure 4:
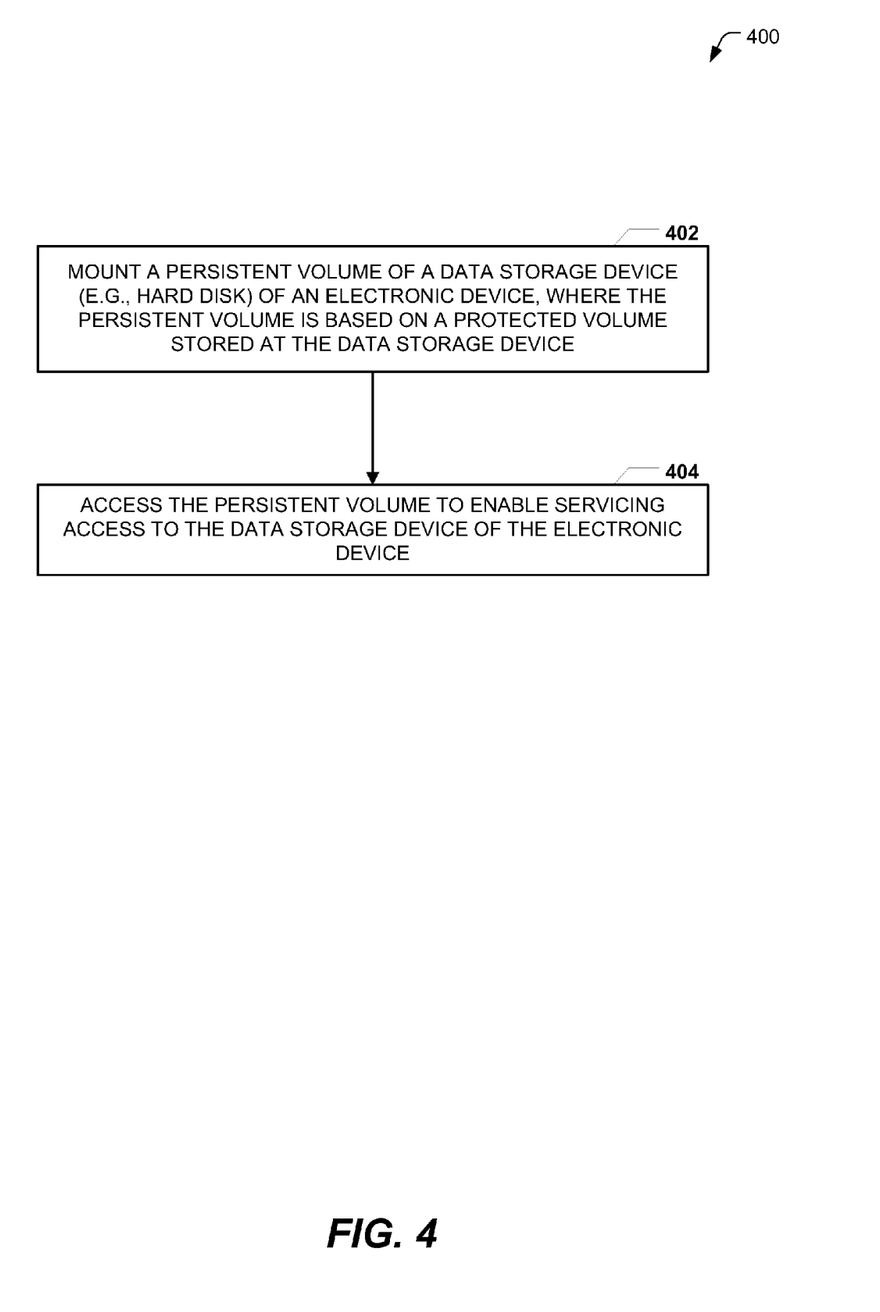
FIG. 4 is a flowchart to illustrate a particular embodiment of a method of enabling servicing access at a persistent volume of an electronic device.

Referring to FIG. 4, a particular embodiment of a method 400 of write filtering and utilizing protected and persistent volumes of a data storage device is shown.

The method 400 includes mounting a persistent volume of a data storage device of an electronic device, at 402. The persistent volume is based on a protected volume stored at the data storage device. For example, in FIG. 1, the persistent volume 130 of the data storage device 146 may be mounted at the system 100, where the persistent volume 130 is based on the protected volume 124.

The method 400 also includes accessing the persistent volume to enable servicing access to the data storage device of the electronic device, at 404. For example, in FIG. 1, the persistent volume 130 may be accessed to enable servicing access to the data storage device 146. In a particular embodiment, the servicing access is an online servicing access that is transparent to one or more applications. To illustrate, such applications may read pre-serviced data from the overlay cache 138 of FIG. 1. The method 400 of FIG. 4 may thus enable online servicing access to a data storage device without disabling a write filter and while maintaining stateless operation for applications supported by the protected volume.

Figure 5:
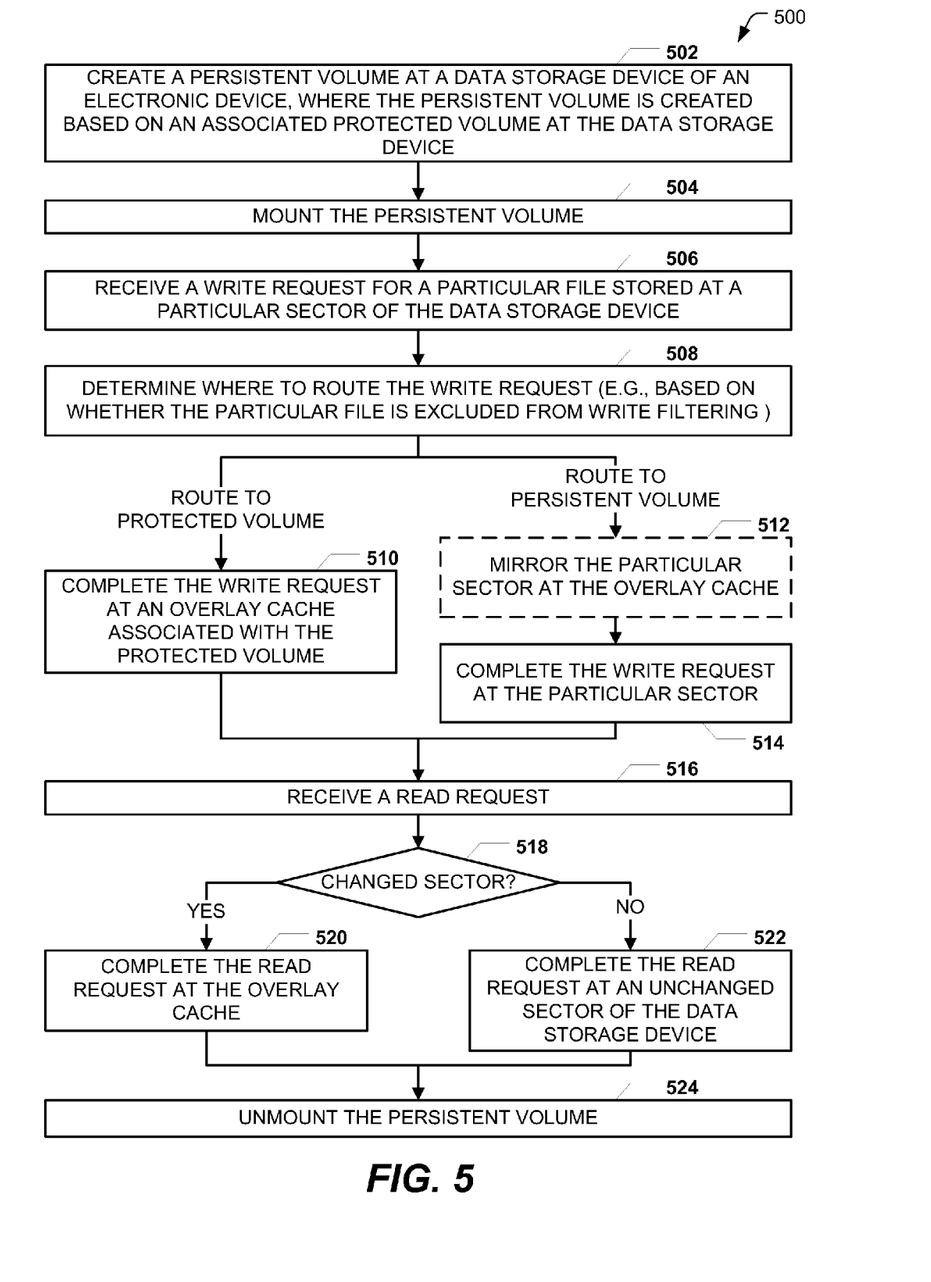
FIG. 5 is a flowchart to illustrate a particular embodiment of a method of completing write and read requests.

Referring to FIG. 5, a particular method 500 of managing a persistent volume of a memory is shown.

The method 500 includes creating a persistent volume at a data storage device of an electronic device, at 502. The persistent volume is created based on an associated protected volume at the data storage device. For example, the persistent volume and the protected volume may be distinct logical volumes that reference the same underlying data storage device (e.g., hard disk).

The method 500 also includes mounting the persistent volume, at 504, and receiving a write request for a particular file stored at a particular sector of the data storage device, at 506. The method further includes determining where to route the write request, at 508. For example, the write request may be routed based on a determination of whether the particular file is excluded from write filtering. In a particular embodiment, determining whether the particular file is excluded from write filtering includes referencing static exclusions (e.g., the static exclusions 120 of FIG. 1), dynamic exclusions (e.g., the dynamic exclusions 122 of FIG. 1), or any combination thereof.

When the write request is routed to the protected volume, the method 500 includes completing the write request at an overlay cache associated with the protected volume, at 510. When the write request is routed to the persistent volume, the method 500 includes mirroring the particular sector at the overlay cache, at 512, and then completing the write request at the particular sector of the data storage device, at 514.

The method 500 further includes receiving a read request, as shown at 516. If the read request is for data of a changed sector, as determined at 518, then the read request is completed at the overlay cache, at 520. However, if the read request is for data at an unchanged sector, then the read request is completed at the unchanged sector of the data storage device, as shown at 522. In addition, the method 500 may include unmounting the persistent volume, at 524. In a particular embodiment, the persistent volume is created and mounted on demand (e.g., each time a write request or batch of write requests for a file, folder, or registry key excluded from write filtering is issued and/or each time a servicing access is initiated). Alternately, the persistent volume may be maintained during runtime and unmounted upon system shutdown.

Figure 6:
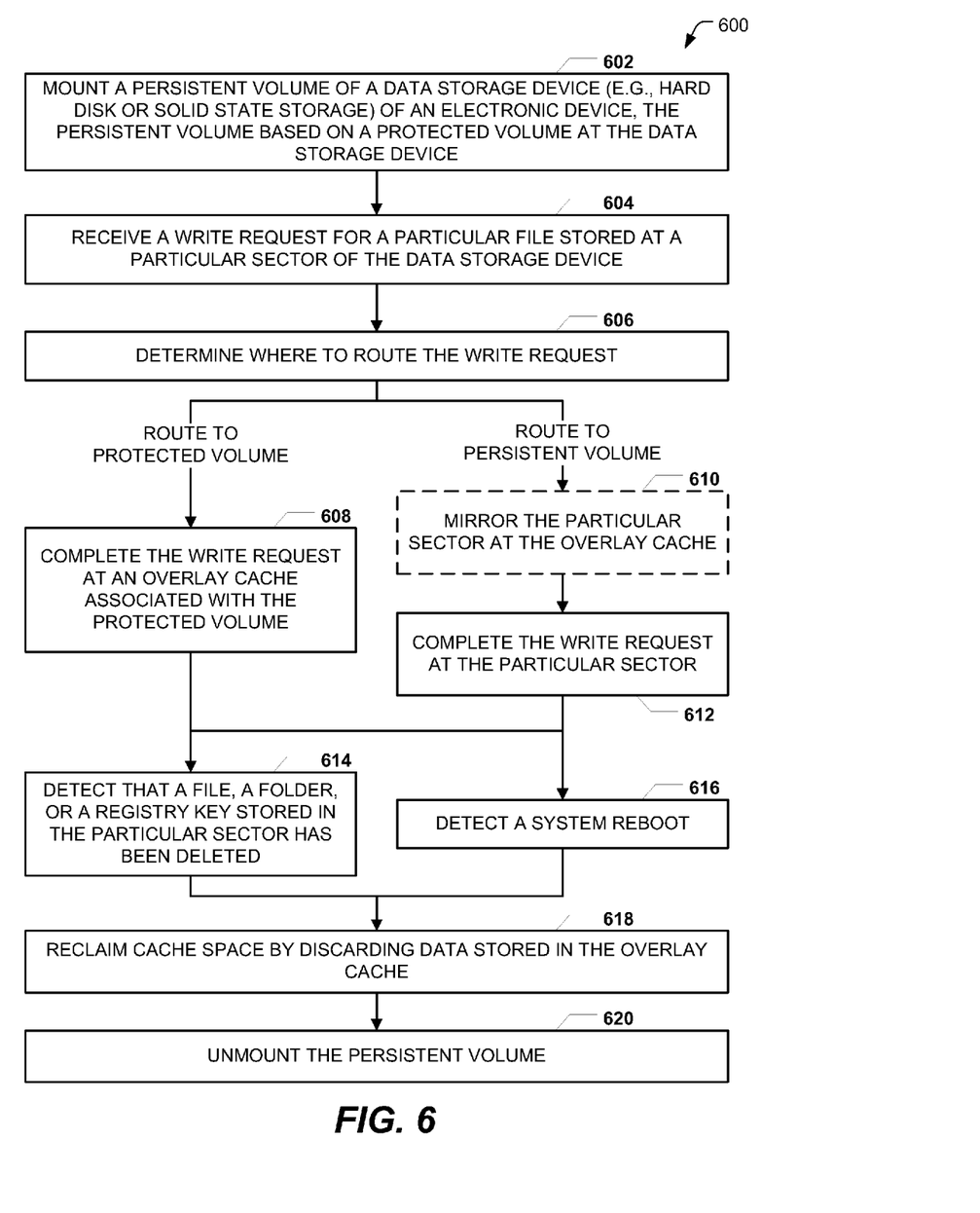
FIG. 6 is a flow chart to illustrate a particular embodiment of a method of completing a write request and reclaiming cache space.

Referring to FIG. 6, another embodiment of a method 600 of managing persistent and protected volumes is shown.

The method 600 includes mounting a persistent volume of a data storage device (e.g., a nonvolatile computer memory) of an electronic device, at 602. The persistent volume of the data storage device may be based on a protected volume of the data storage device. The method 600 also includes receiving a write request for a particular file that is stored at a particular sector of the data storage device, at 604. A determination is made as to where to route the write request, at 606. If the write request is routed to the protected volume, then the method 600 completes the write request at an overlay cache associated with the protected volume, at 608. If the write request is routed to the persistent volume, the method 600 includes mirroring the particular sector at the overlay cache, at 610, and completing the write request at the particular sector, at 612.

The method may proceed to detect that a file, a folder, or a registry key stored in the particular sector has been deleted, at 614, and/or detect a system reboot, at 616. In response, the method 600 proceeds to reclaim cache space by discarding data stored in the overlay cache, at 618, and optionally unmounting the persistent volume, at 620. Reclaiming cache space by discarding data following deletions or system reboots may keep the overlay cache small and may provide additional storage space (when the overlay cache is stored on disk) or working memory (when the overlay cache is stored in system memory, e.g., random access memory (RAM)).

Figure 7:
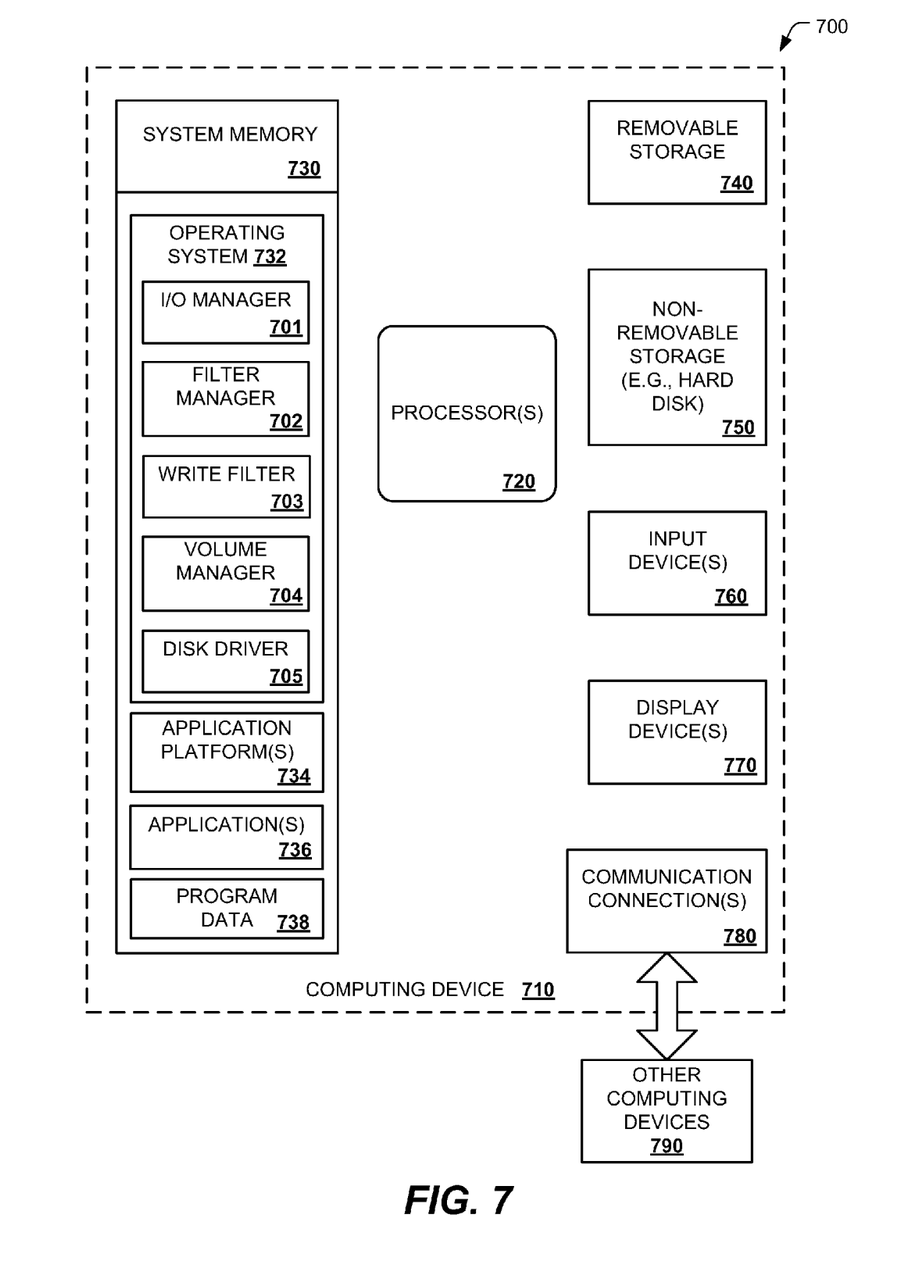
FIG. 7 is a block diagram to illustrate a particular embodiment of a computing environment including a computing device to support systems, methods, and computer program products described in FIGS. 1-6.

FIG. 7 depicts a block diagram of a computing environment 700 including a computing device 710 operable to support embodiments of systems, methods, and computer program products according to the present disclosure.

The computing device 710 includes at least one processor 720 and a system memory 730. Depending on the configuration and type of computing device, the system memory 730 may be volatile (such as random access memory or "RAM"), non-volatile (such as read-only memory or "ROM," flash memory, and similar memory devices that maintain stored data even when power is not provided), or some combination of the two. The system memory 730 typically includes an operating system 732, one or more application platforms 734, one or more applications, and program data 738. For example, the operating system 732 may include an I/O manager 701 (e.g., the I/O manager 114 of FIG. 1), filter manager 702 (e.g., the filter manager 116 of FIG. 1), a write filter 703 (e.g., including the file/registry redirector 118 and the overlay managers 128 and 134 of FIG. 1), a volume manager 704 (e.g., the volume manager 142 of FIG. 1), and a disk driver 705 (e.g., the disk driver 144 of FIG. 1), as illustrated. The I/O manager 701, the filter manager 702, the write filter 703, the volume manager 704, and the disk driver 705 may implement write filtering, as described with reference to FIGS. 1-6.

The computing device 710 may also have additional features or functionality. For example, the computing device 710 may include removable and/or non-removable additional data storage devices, such as magnetic disks, optical disks, tape devices, and standard-sized or flash memory cards. Such additional storage is illustrated in FIG. 7 by removable storage 740 and non-removable storage 750 (e.g., the data storage device 146 of FIG. 1, the data storage device 240 of FIG. 2, or the data storage device 310 of FIG. 3). Computer storage media may include volatile and/or non-volatile storage and removable and/or non-removable media implemented in any technology for storage of information such as computer-readable instructions, data structures, program components or other data. The system memory 730, the removable storage 740 and the non-removable storage 750 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 710. Any such computer storage media may be part of the computing device 710.

The computing device 710 may also have input device(s) 760, such as a keyboard, mouse, pen, voice input device, touch input device, motion or gesture input device, etc, connected via one or more wired or wireless input interfaces. Output device(s) 770, such as a display, speakers, printer, etc. may also be connected via one or more wired or wireless output interfaces.

The computing device 710 also contains one or more communication connections that allow the computing device 710 to communicate with other computing devices 790 over a wired or a wireless network. It will be appreciated that not all of the components or devices illustrated in FIG. 7 or otherwise described in the previous paragraphs are necessary to support embodiments as herein described. For example, the removable storage 740 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. For example, a calendar application may display a time scale including highlighted time slots or items corresponding to meetings or other events.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    creating a persistent volume of a data storage device of an electronic device in response to a request for service access to the data storage device, wherein the persistent volume is based on a protected volume also stored at the data storage device, wherein the persistent volume is mountable independently from the protected volume and the protected volume is mountable independently from the persistent volume, and wherein the electronic device includes an overlay cache memory distinct from the persistent volume and the protected volume, and wherein the persistent volume is inaccessible to a user of the electronic device while the persistent volume is mounted;
    mounting the persistent volume;
    receiving a write request for a particular file stored at a particular sector;
    determining where to route the write request based on whether the particular file is excluded from write filtering, wherein the determination is at least partially based on a static exclusion that lists one or more files that are to be excluded from write filtering and a dynamic exclusion that is created at the time of mounting the persistent volume that lists one or more files that are to be excluded from write filtering;
    filtering the write request including:
        if the write request is routed to the protected volume when the particular file is not excluded from write filtering:
            copying the particular sector from the protected volume to a location at the overlay cache before writing data specified by the write request to the particular sector; and
            writing the data specified by the write request at the location at the overlay cache; and if the write request is routed to the persistent volume when the particular file is excluded from write filtering:
  mirroring the particular sector from the persistent volume to the overlay cache before writing data specified by the write request to the particular sector; and
  writing the data specified by the write request at the particular sector of the persistent volume; and
in response to a determination that the service access to the data storage device is no longer needed, unmounting the persistent volume.

2. The method of claim 1, wherein the data storage device comprises a solid state storage device, a hard disk, or any combination thereof.

3. The method of claim 1, wherein the persistent volume reflects a directory structure and data on the protected volume.

4. The method of claim 1, wherein the filtering is performed by a kernel of an operating system.

5. The method of claim 1, further comprising:
receiving a read request at the protected volume;
when the read request is for a changed sector of the data storage device, accessing the overlay cache in response to the read request; and
when the read request is for an unchanged sector of the data storage device, accessing the unchanged sector at the data storage device in response to the read request.

6. The method of claim 1, further comprising discarding data stored in the overlay cache in response to detecting a deletion of a file, a folder, a registry key using the particular sector of the data storage device, in response to a system reboot, or any combination thereof.

7. The method of claim 1, further comprising, when the write request is routed to the persistent volume, writing data to a particular file in the data storage device in response to the write request.

8. The method of claim 7, further comprising mirroring a plurality of sectors associated with the particular file at the overlay cache memory prior to writing the data to the particular file in the data storage device.

9. The method of claim 1, wherein the write request comprises a file write request, a folder write request, or a registry write request.

10. The method of claim 1, wherein the protected volume is mounted as a first logical volume with a first file system and a first overlay manger, and wherein the persistent volume is mounted as a second logical volume with a second file system and a second overlay manager.

11. The method of claim 1, wherein the electronic device comprises a mobile computing device, a personal computing device, or any combination thereof.

12. The method of claim 1, wherein the write request is issued by an application supported by a user mode of an operating system, and wherein the filtering is carried out by a kernel mode of an operating system.

13. The method of claim 1, wherein the electronic device comprises a stateless device, and wherein the stateless device comprises a kiosk, a point of sale device, an embedded device, or any combination thereof.

14. A system comprising:
a processor;
a data storage device comprising a protected volume and a persistent volume, the persistent volume being mounted in the data storage device in response to a request for service access to the data storage device, wherein the persistent volume is inaccessible to a user of an electronic device that includes the data storage device while the persistent volume is mounted, wherein the persistent volume is unmounted when the service access is no longer needed;
an overlay cache distinct from the protected volume and the persistent volume; and
a write filter comprising:
  a redirector executable by the processor to determine whether to route a write request for a particular file stored using a particular sector of the data storage device to the protected volume of to the persistent volume, wherein the determination is at least partially based on a static exclusion that lists one or more files that are to be excluded from write filtering and a dynamic exclusion that is created at the time of mounting the persistent volume that lists one or more files that are to be excluded from write filtering, wherein the protected volume is mountable independently from the persistent volume and the persistent volume is mountable independently from the protected volume; and
  and overlay manager executable by the processor to:
    upon detection of the write request being routed to the protected volume when the particular file is not excluded from write filtering:
      copy the particular sector from the protected volume to the overlay cache before writing data specified by the write request to the particular sector; and
      write the data specified by the write request to the copy of the particular sector in the overlay cache; and
    upon detection of the write request being routed to the persistent volume when the particular file is excluded from write filtering:
      mirror the particular sector of the persistent volume to the overlay cache before writing data specified by the write request to the particular sector;
      and write the data specified by the write request to the particular sector of the persistent volume.

15. The system of claim 14, wherein the write request is issued by an application supported by a user mode of an operating system, and wherein the write filter is integrated into a kernel mode of the operating system, the kernel mode further comprising:
an input/output manager configured to receive the write request;
a filter manager configured to apply the write filter to the write request; and
a driver configured to write data to the storage device.

16. A hardware storage device comprising instructions that, when executed by a computer, cause the computer to:
create a persistent volume at a data storage device of an electronic device in response to a request for service access to the data storage device, wherein the persistent volume is created based on a protected volume at the data storage device, wherein the persistent volume is mountable independently from the protected volume and the protected volume is mountable independently from the persistent volume, wherein the persistent volume is inaccessible to a user of the electronic device while the persistent volume is mounted; mount the persistent volume;
create an overlay cache distinct from the persistent volume and the protected volume; receive a write request for a particular file stored using a particular sector of the data storage device;

determine whether to route the write request to the protected volume or to the persistent volume, wherein the determination is at least partially based on a static exclusion that lists one or more files that are to be excluded from write filtering and a dynamic exclusion that is created at the time of mounting the persistent volume that lists one or more files that are to be excluded from write filtering;

upon detection of the write request being to the protected volume when the particular file is not excluded from write filtering:

copy the particular sector from the protected volume to a particular location at the overlay cache before writing data specified by the write request to the particular sector; and write the data specified by the write request to the particular location at the overlay cache;

upon detection of the write request being routed to the persistent volume when the particular file is excluded from write filtering:

mirror the particular sector from the persistent volume at the overlay cache before writing data specified by the write request to the particular sector;

write the data specified by the write request to the particular sector of the persistent volume; and unmount the persistent volume in response to a determination that the service access to the data storage device is no longer needed.

17. The storage device of claim 16, further comprising instructions that, when executed by the computer, cause the computer to: receive a read request at the protected volume;

when the read request is for a changed sector of the data storage device, access the overlay cache in response to the read request; and when the read request is for an unchanged sector of the data storage device, access the unchanged sector at the data storage device in response to the read request.

18. The method of claim 10, wherein applications continue execution using the data storage device while the system is being updated.

19. The method of claim 18, wherein applications continue execution including one of reading, writing, or reading and writing to the mirrored sector of the persistent volume thereby enabling the system update to be carried out on the sector without stopping the applications.

* * * * *